| United States Patent [19] | [11] Patent Number: 4,581,384 |
| Marion | [45] Date of Patent: Apr. 8, 1986 |

[54] METHOD OF PRODUCING A POLYURETHANE FOAM FROM A POLYOL CONTAINING AN UNSATURATED POLYESTER AND A POLYISOCYANATE CONTAINING A VINYLIDENE MONOMER

[75] Inventor: Donald L. Marion, Turnersville, N.J.

[73] Assignee: Atlantic Richfield Company, Los Angeles, Calif.

[21] Appl. No.: 687,412

[22] Filed: Dec. 28, 1984

[51] Int. Cl.$^4$ ............................................. C08G 18/14
[52] U.S. Cl. .................................... 521/110; 521/131; 521/172; 521/173
[58] Field of Search ................ 521/110, 131, 172, 173

[56] References Cited

U.S. PATENT DOCUMENTS

| 3,860,537 | 1/1975 | Graham et al. | 521/172 |
| 3,886,229 | 5/1975 | Hutchinson et al. | 528/76 |
| 4,386,166 | 5/1983 | Peterson et al. | 521/99 |

*Primary Examiner*—Maurice J. Welsh
*Attorney, Agent, or Firm*—Delbert E. McCaslin

[57] ABSTRACT

A method for producing polyester modified, polyurethane foam having a density of from about 1 to 40 pounds per cubic foot, and the product produced by said method, are disclosed and claimed. A first composition or mixture is prepared comprising a relatively high molecular weight polyol, and a minor but effective amount of a hydroxy-containing, unsaturated polyester, soluble in or miscible with the polyol; a second composition or mixture is prepared comprising an isocyanate or polyisocyanate soluble in or miscible with a vinylidene type cross-linking monomer for the unsaturated polyester, the cross-linking monomer being exemplified by styrene, said first and second mixtures being blended together just prior to production of the foam, thereby enabling the production of a more homogeneous foamed product having improved physical properties, especially those enhancing the product's usefulness for insulation purposes.

15 Claims, No Drawings

METHOD OF PRODUCING A POLYURETHANE FOAM FROM A POLYOL CONTAINING AN UNSATURATED POLYESTER AND A POLYISOCYANATE CONTAINING A VINYLIDENE MONOMER

BACKGROUND OF THE INVENTION

This invention relates to a novel, modified, urethane polymeric system, eminently suited for the manufacture of foamed insulating products, especially so-called rigid, foamed insulating products.

Polyurethanes contain carbamate groups, —NH-COO—, also referred to as urethane groups in their backbone structure. Characteristically, they are obtained by the reaction of a diisocyanate with a macroglycol, sometimes more simply referred to as a polyol, or with a macroglycol and a short-chain glycol extender. The macroglycols or polyols are based on polyethers, polyesters, or a combination of both.

The polymerization of diisocyanates with macroglycols to produce urethane polymers was pioneered by O. Bayer. The polymerization process is frequently referred to as a polyaddition one, although there is some authority that it may also be referred to as partly condensation in nature. In any event, the urethane forming reaction is a rapid one, and high molecular weight polymers have been obtained from liquid monomers, even at ambient temperatures, to give products ranging from cross-linked network polymers to linear fibers and elastomers.

In addition to linear thermoplastic polymers, i.e., polyurethanes obtained from difunctional monomers, branched or crosslinked thermoset polymers are made with higher functional monomers. The higher functionality is obtained with higher functional isocyanates, typically so-called polymeric isocyanates, or with higher functional polyols.

Urethane network polymers may be formed by the trimerization of part of the isocyanate groups. The approach is frequently used in the formation of rigid-modified isocyanurate foams with the following structure:

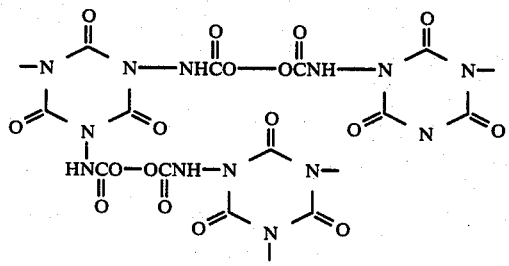

Involved in the present invention herein are resin systems which have previously been investigated, but which have not, to the best of applicant's knowledge, ever been combined or "put together", so to speak, in the fashion or manner hereinafter disclosed.

Two basic independent formation reactions take place in my system, with a third one being optional. One involves the formation of the urethane polymer, and more specifically, involves the reaction of an isocyanate with a component containing hydroxyl groups. Utilizing bi- or polyfunctional polyols or compounds containing a multiplicity of hydroxyl groups, such as polyethers or polyesters, and di- or polyisocyanates, either linear or cross-linked polyurethanes are formed, depending upon the functionality of the reactants. This is an exothermic reaction and is shown generally as follows:

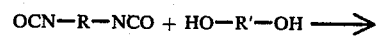

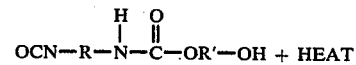

The properties, both physical and chemical, of the polymer depend upon the nature, functionalities and ratios of the reactants, all of which can be varied.

Polyesters which are hydroxy terminated are most often used with the isocyanates; glycols frequently used include, ethylene, propylene, butylene and diethylene; triols such as glycerol and trimethylol ethane and propane have also been used. Both saturated and unsaturated dicarboxylic polyesters have been used, including mixtures thereof.

In the systems involved in my invention, the polyester is an unsaturated polyester, or mixture thereof with a saturated polyester, but the unsaturated polyester forms the predominant entity. Thus, a second and independent reaction involved is the curing or cross-linking of the unsaturated polyester moiety with a cross-linking type of vinylidene monomer, for example, styrene, in the presence of a free radical catalyst. The unsaturated, polyester cross-linking reaction is shown generally, as follows:

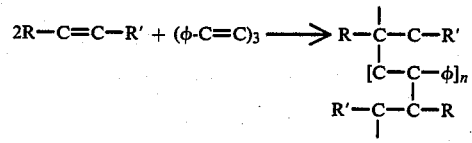

Optionally, and when so desired, a third reaction can take place. When so desired, a conventional trimerization catalyst can be used to trimerize the isocyanate to produce polyisocyanate products. This is another exothermic reaction and is shown generally, as follows

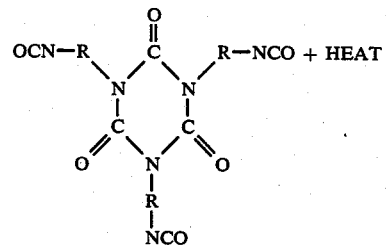

The present invention carries out or controls these essentially independent reactions, in a surprising and unexpected manner, by mixing and reacting primarily only two reactant compositions or streams, each of which is so formulated, so that not only are the reactions initiated at substantially the same time, but that they (i.e., both independent reactions) proceed substantially uniformly and evenly, and within essentially the same time frame (total), from start to finish, that is to completion. This gives a product, especially a foamed product, with which the invention is primarily concerned, which is essentially homogeneous, and which has unexpectedly improved physical properties, especially the important physical property of dimensional stability.

With reference to specific prior art, worthy of mention is Graham et al., U.S. Pat. No. 3,860,537, which utilizes a stepwise procedure and partially cured precursors. Separate and distinct sequential polymerizations appear to be involved, a procedure which is inherently different than the procedure used in my invention. Foamed products are mentioned in Graham et al., and a polyol, an unsaturated polyester and isocyanate are used in Graham et al.

Another teaching in the field is that of Hutchinson et al, U.S. Pat. No. 3,886,229. While foams are not specifically mentioned, again precursors of the polymers are used in a manner different from that disclosed and claimed in my invention.

A more recent teaching in the prior art is that of Peterson et al, U.S. Pat. No. 4,386,166, which involves a foam prepared from an unsaturated polyester resin, a copolymerization monomer, a low molecular weight polyol and an isocyanate. As will become more apparent from the disclosure following hereinafter, my system and procedure involve several essential and unobvious differences from Peterson et al. For the present, however, it may be relevant to point out that the primary objectives in Peterson et al, are different from those in my invention; Peterson et al, apparently being primarily concerned with the manufacture of an insulating foam board, based on an unsaturated polyester resin, which is capable of high filler loadings and improved flame spread and smoke generation characteristics; said objectives in Peterson et al, are consistent inasmuch as it is known that certain fillers, such as hydrated alumina, the main filler used in Peterson et al, will improve flame retardant characteristics of polymeric foamed systems; whereas as stated before, I am primarily concerned with improving the physical dimensional stability of the foamed product, without any appreciable loss in the performance characteristics of other important properties.

SUMMARY OF THE INVENTION

Broadly, this invention relates to Polyurethane insulating foams, especially so-called, rigid, insulating foams, having a density in the range of from about 1 to about 40 pounds per cubic foot, to the method of producing said foams, and to the foamed product itself. The foam may be prepared in the form of planks or boards, usually in the range of 1 to 10 inches in thickness, although greater thicknesses can also be produced, or the foam may be prepared in place, into an irregular shaped form, or the like. In my method, composition and product, the polyurethane foamed product is modified, in a particular way, so as to yield a network incorporation of the unsaturated polyester, which is uniformly cross-linked and dispersed throughout the polyurethane system, and by the use of relatively high molecular weight polyols.

Polyurethane foams and foamed products enjoy widespread use as superior insulating materials, primarily because of their low thermal conductivity, or low K-factor as it is known in the art. Indeed, amongst the commercially available polymeric systems, foamed or otherwise, polyurethane foams are generally considered to have the lowest K-factors available, making them definite candidates for almost any insulating application in our energy-concious-saving society. However, as with virtually all materials, whether used for construction purposes or otherwise, the choice of any particular material for a particular use is generally based on a cost-effective basis, which necessarily requires giving due consideration to the overall balance of properties that the material has. It is in the nature of things, that generally, when one tries to improve upon a particular physical characteristic that is lacking in performance, it can only be achieved by compensating for it by a decrease in a performance characteristic that is already satisfactory.

The present invention has as one of its principal objectives, a significant and unexpected increase in dimensional stability of the foam, or foamed product, without appreciable loss in other physical properties of the polyurethane foam systems.

In preparing a polyurethane foam, it is general terminology in the art to speak about mixing an "A" side or composition and a "B" side or composition, at least one of which contains the usual activating agents, such as catalysts, blowing agents, etc., allowing the mixture to cream and foam by reason of the heat that is generated by the polymerization or other exothermic reactions that normally take place, the heat being sufficient to cause gas generation from the blowing agent and also cross-linking of the unsaturated polyester (when one is present) with a vinylidene type cross-linking agent. The reaction of reactions which take place depend to a large degree on the makeup of the A and B compositions, and they are so formulated so that the foamed polymer that is formed contains a high percentage of closed cells.

Closed cells are most desirable for maximum insulating properties, and because, while they may permit the transmission of water vapor, they do not permit the transmission of water, per se. The denomination of "A" and "B" for a particular side is arbitrary, but taking the so-called polyol side as the B side or composition, and the isocyanate or polyisocyanate as the A side or composition, the compositions are so formulated so that the stoichiometric ratio of NCO/OH equivalents is in the range of about 1.10/1.00 or higher.

In preparing a standard, unmodified composition, which will be used for comparative purposes, hereinafter, (as well as the modified compositions of the present invention), the above-mentioned convention will be followed, that is, the B side, or composition will comprise the polyol composition, and the A, the polymeric isocyanate side or composition. The polyol composition is prepared simply by mixing the specific polyol, (and unsaturated polyester component, when one is present as in my invention) silicone surfactant, catalyst(s) and fluorocarbon blowing agent. (While the surfactant, catalysts(s) and fluorocarbon blowing agent are usually placed on the polyol side, they may be placed on either side, or partly on one side and partly on the other side). Also as noted hereinbefore and hereinafter in greater detail, the usual practice in preparing the modified compositions of my invention is to place substantially all of the unsaturated polyester component, undiluted or undissolved with any monomer such as styrene, and without inhibitor on the polyol side, the unsaturated polyester component being soluble in or miscible with the specific liquid polyether polyols I use, and place substantially all of the cross-linking monomer, such as styrene on the polyisocyanate side with which it is miscible or soluble. The A and B sides are equilibrated to standard temperature. Then a weighed amount of B side is added to a suitable container followed by addition of the A side or composition. The amount of isocyanate is based on a stoichiometric ratio of NCO/OH equivalents, typically 1.10/1.00, or higher. Immediately after addition of the A side to the B side, the blend is mixed at high speed, for example, at 3000 RPM or higher, for about 10 to 20 seconds.

Then the mixture is poured into a suitable container, such as a cardboard box, and the polymerization and cross-linking reaction (when a cross-linker is present) proceed while the foaming reaction progresses through it several phases. Reactivity of the foaming mixture; is monitored by observations of cream time, rise time, and tack-free times. Foams with shorter intervals for each of these observations are considered to be more reactive. After aging at ambient conditions for 2-3 days, the mechanical or physical properties of the foams are determined by standard ASTM tests.

In the case of formulations identified as urethane-isocyanurate, such are designated because they contain known trimerization catalyst and employ high (1.5/0.0) NCO/OH equivalents ratio.

It will be convenient to descibe, both generally, and in detail, the type of compositions making up the polyol side which are used in my invention.

In those systems which have been investigated wherein both an unsaturated polyester and a polyol have been combined with an isocyanate, no particular criticality in the use of both the polyester and the polyol, as far as is known, has been almost any of the type known in the art, as long as it contained hydroxy groups, or was hydroxy-terminated, as likewise also with the polyol, for example, ethylene glycol, glyerol, etc.

To obtain the optimum properties in the present invention, it has been determined that the unsaturated polyester component, i.e., the non-cross-linked unsaturated polyester component, should have certain characteristics. These include (1) a relatively low molecular weight, usually between about 1000 to 3000, more preferably, about 1500 to about 2500; (2) the unsaturated polyester should be soluble in or miscible with the relatively high molecular weight polyols used in my invention; and (3), while it may be diluted or dissolved with some of the usual vinylidene containing monomer, such as styrene, it need not be. That is to say, while the unsaturated polyester is one which may be dilutable, diluted or dissolved with styrene, or the like, (actually it is preferred that it not be) it is unnecessary to do so, it being understood that the unsaturated polyester is soluble in or miscible with my particular polyols of choice. Also, the unsaturated polyester component should have a relatively low acid number, usually in the range of from about 1 to 10, perferred 1 to 3, and a fairly high hydroxyl together with the polyol, alone, i.e., the combination, the unsaturated polyester should comprise, from about, on a weight percent basis, 2 to about 30 percent of the mixture, more preferably about 5 to 25 percent of the mixture, the balance of course, being the polyether polyol. Additionally, of course, the unsaturated polyester contains hydroxy groups, or is hydroxy-terminated.

The unsaturated polyesters which are used in the present invention are prepared by, and from, materials known in the art. They are generally the reaction products of one or more polycarboxylic acids and one or more polyhydric alchols. One or more of the components of the polyester must by ethylenically unsaturated, preferably the polycarboxylic acid component. Representative unsaturated polycarboxylic acids include, for example, dicarboxylic acids such as fumaric acid, maleic acid, maleic anhydride, itaconic acid, citraconic acid, and others. Maleic acid, or its anhydride, and fumaric acid are preferred. Other acids may also form part of the polycarboxylic acid makeup, and suitable examples include phthalic acid, isophthalic acid, terephthalic, succinic acid, adipic acid, suberic acid, sebacic acid, azelaic acid, and others. Representative polyhydric alchols include for example, glycols, such as ethylene glycol, triethylene glycol, tetraethylene glycol, propylene glycol, dipropylene glycol, and hexylene glycols; triols, such as glycerol, trimethylolethane, trimethylolpropane and hexane triol, pentaerythritol, etc.

The unsaturated polyester may be liquid at room temperature or semi-solid, so long as it can be liquified by gentle to moderate heating. The unsaturated polyesters form cross-linked copolymerizates or resins with vinylidene cross-linking monomers, such as styrene, as well known in the art. The cross-linked resin should have a range of tensile elastic modulus of from about 100,000 to 600,000, or higher; more preferably of from about 200,000 to 500,000. The unsaturated polyester component shoule be made up up from or comprise about 60-90 mole percent unsaturated dicarboxylic acid, and correspondingly from about 40 to 10 mole percent aromatic (having normal aromatic-unsaturation) and/or saturated, aliphatic dicarboxylic acids, while the polyhydroxy component is primarily and usually a glycol, or mixture of glycols.

In addition to styrene, other cross-linking vinylidene monomers that may be used include, for example, vinyl aromatics such as vinyl toluene, alpha-methyl styrene, divinyl benzene, dichlorostyrene, esters of alpha, beta-ethylenically unsaturated monocarboxylic acids, such as methyl methacrylate, methyl acrylate, ethyl acrylate and 2-ethylhexyl acrylate, vinyl esters such as vinyl acetate and propionate. The preferred cross-linking monomers are styrene and vinyl toluene. Considering the combination of the unsaturated polyester component and the vinylidene cross-linking monomer, said vinylidene monomer should comprise about 30 to 70 weight percent of the combination, for adequate cross-linking purposes and to achieve the desired results of this invention, and the balance, about 70 to about 30 weight percent unsaturated polyester component.

Returning again to the cross-linked copolymerizate, typified by styrene cross-linked unsaturated polyester copolymerizate or resin, I have been able to obtain unexpected and improved results, especially in the important physical characteristic of dimensional stability of the foamed product, by departing from the teachings of the prior art, more specifically by putting the styrene on the "iso" side or composition, instead of diluting or dissolving the unsaturated polyester component with the styrene or similar cross-linking monomer, the unsaturated polyester component being, of course, part of the "polyol" side or composition. (It is not absolutely necessary to put all of the styrene or other similar cross-linking monomer or agent on the "iso" side; part of the styrene or the like can be placed on the polyol side, but the major portion should be on the "iso" side). Also used is a relatively high molecular weight liquid polyol in which the unsaturated polyester component is soluble or miscible, said polyol preferably being a polyether polyol having a molecular weight in the range of about 1000 to 3000, and a hydroxyl number above 200, preferably above 300. (Additional information concerning the polyol follows hereinafter). It is further noted that this arrangement does not usually require the use of an inhibitor for the polyester component since it is preferably not diluted or mixed with any styrene, or the like, prior to the desired cross-linking reaction producing the cross-linked unsaturated polyester resin.

As a consequence of this arrangement, as described above, the dynamics of the system are such that, it is believed and postulated that during the formation of the polyurethane rigid foam, all of the independent reactions, i.e., the urethane polymer forming reaction, the cross-linking reaction of the unsaturated polyester component by the styrene, or like functioning monomer, (and the trimerization of the isocyanate, when a trimerization catalyst is used and trimerization is desired) are surprisingly and unexpectedly more or less proceeding or going on at a relatively uniform and even rate. Stated in another way, the reactions appear to be not only initiated at substantially the same time, but they also proceed, from start to finish, that is to completion, substantially uniformly and evenly within the same total time frame. This includes the reaction of the hydroxyl group of the unsaturated polyester with the isocyanate, as well as the cross-linking of the unsaturated polyester component by the styrene or similiar material. Measurements of residual styrene monomer in the foamed product show that only minute amounts are present, indicating that virtually all of the styrene is used up in the cross-linking reaction. As a result of this procedure, it appears that the cross-linked polyester resin is more uniformly an evenly distributed or dispersed throughout the polymeric urethane polyester system, This unique distribution or dispersion appears to account for the unexpected improvement in the dimensional stability of the foamed product. In a sense, the cross-linked unsaturated polyester resin, which inherently has more tensile strength than the polyurethane, distributed or dispersed in chain-like or rod-like or even coiled geometric patterns, act somewhat similar to the steel rods, or the like, which are used to reinforce concrete. As is well known, concrete has outstanding compressional characteristics, but fails easily in tension. Like the steel rods in reinforced concrete, the cross-linked unsaturated polyester "rods", "chains", "coils", or the like, carry the load in tension and generally help in restraining the polyurethane rigid foam system from expanding too greatly when tensile stresses are present, such as when the foamed product is subjected to long term heat effects. For example, a roof made of the product of my invention and used primarily for insulation purposes would not be expected to crack or fissure, whereas the prior art system might well do this under the same conditions.

Admittedly, while the theoretical explanation offered for the events occurring in the reacting system, is clearly thought to be accurate and consistent with the results obtained, other possible explanations could be proposed. However, it is to be understood that while another theory might be advanced to explain the phenomena that occurs, the invention is not dependent on any particular theory preferred, inasmuch as it is fully supported by the disclosure herein, including the specific embodiments hereinafter set forth, and by the claims appended hereto which distinctly claim and point out Applicant's invention.

With further reference to the polyols used in the present invention, they are best described as polyether polyols and are known alkylene oxide addition products made by known methods. The alkylene oxide polymerization is usually initiated by alkali hydroxides, or by Lewis-Acid catalysts, e.g., boron trifluoride. Polyether polyols are medium to high molecular weight materials that range in viscosity from liquids to waxy solids. Preferred molecular weights for the polyether polyols used in my invention have already been given; in addition the polyether polyols should have a hydroxyl equivalent weight in the range of from about 100 to 300, calculated as follows:

$$\text{hydroxyl equivalent wt.} = \frac{(56.1)(1000)}{\text{Hydroxyl No. of Polyol}}$$

Some typical polyol polyethers that can be used in my invention are given Table 1, below:

TABLE 1

| PRODUCT | FUNCTIONALITY | INITIATOR | CYCLIC EITHER |
|---|---|---|---|
| poly(ethylene glycol) (PEG) | 2 | water or ethylene | ethylene oxide |
| poly(propylene glycol) (PPG) | 2 | water or propylene | propylene oxide |
| PPG/PEG* | 2 | water or propylene glycol | propylene oxide and ethylene oxide |
| poly(tetramethylene glycol) (PTMG) | 2 | water | tetrahydrofuran |
| glycerol adduct | 3 | glycerol | propylene oxide |
| trimethylopropane adduct | 3 | trimethylolpropane | propylene oxide |
| pentaerythritol adduct | 4 | pentaerythritol | propylene oxide |
| ethylenediamine adduct | 4 | ethylenediamine | propylene oxide |
| phenolic resin adduct | 4 | phenolic resin | propylene oxide |
| diethylenetriamine adduct | 5 | diethylenetriamine | propylene oxide |
| sorbitol adducts | 6 | sorbitol | propylene oxide or ethylene oxide |
| sucrose adducts | 8 | sucrose | propylene oxide |

*Random or block copolymers.

Concerning the isocyanates that can be used in my invention, the commonly available and known insocyanates used for polyurethane foam production may be used. These include, for example: Tolylene diisocyanate, (2,4- and/or 2,6-isomer), diphenylmethane diisocyanate, ditolylene diisocyanate, naphthalene diisocyanate (for example, 1,5-naphthalene diisocyanate), triphenylmethane triisocyanate, anisidine diisocyanate, xylylene diisocyanate, tris(isocyanatophenyl)thiophosphate, mixture of a polymethylene polyphenylisocyanate shown by the follownig general formula (so-called crude MDI or polymeric isocyanate) obtained by reaction of low polycondensate of aniline and formaldehyde with phosgene,

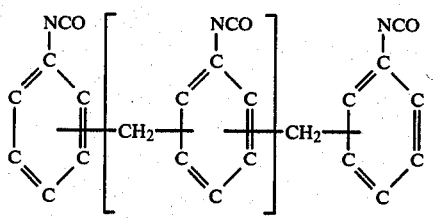

With reference to the urethane polymerization reaction, urethane reaction catalysts are well known. The chain-extension reacts where the polyol react with the isocyanate to produce the polyurethane, is accelerated by the tertiary amines, especially when they contain a metal co-catalyst. Suitable tertiary amines include triethylene diamine, tetramethylbutane diamine, triethylamine, n-methyl morpholine, N-ethyl morpholine, diethyl ethanolamine, 1-methyl-4-dimethylamine, ethyl piperzine, 3-methyl isopropyl propylene amine, N-N-diethyl-3-diethyl amino propyl amine, and dimethylbenzyl amine. Suitable metal co-catalysts for carrying out the urethane formation are: for example, organometallic compounds of copper, tin, zinc, lead, mercury, cadmium, bismuth, cobalt, manganese, antimony, iron and the like such as, for example, metal salts of carboxylic acids having from about 2 to about 20 carbon atoms including for example stannous, octoate, stannous chloride, dimethyltin mercaptide, dibutyltin dilaurate, dibutyltin diacetate, dibutyltin di-2-ethyl hexoate, ferric acetyl acetonate, lead octoate, lead oleate, cobalt naphthenate, lead naphthenate, mixtures thereof and the like. It is preferred that the catalysts be employed in liquid form. Those catalysts which are not ordinarily liquids may be added as a solution in solvent.

When it is optionally desired to trimerize the isocyanates or polyisocyanates, numerous trimerization catalyst are available which may be used.

One group of polyisocyanate trimerization catalysts is teritary amines, for example, triethylamine, N.N.'N."-tris(dimethylaminopropyl)hexahydrotriazine, 2,4,6-tris(dimethylaminomthyl)phenol, and tetramethyl ethylenediamine.

Another polyisocyanate trimerization catalyst system is the three component one firstly including an amine salt, preferably a quaternary ammonium compound such as the DABCO TMR line of catalysts from Air Products and Chemicals of Allentown, PA. Specific examples include DABCO TMR and DABCO TMR-2, which are amine salts, particularly, quaternary ammonium compounds suspended in a high boiling organic solvent such as glycol. For example, DABCO TMR-2 is a liquid composition of the N-hydroxypropyl trimethyl ammonium salt of formic acid, which ahas a hydroxyl number of 685 in a glycol having an ammonia-like odor, a boiling point of about 250° F., a specific gravity of 1.055 at 25° C. and a pH in a 3% aqueous solution of about 6.5.

A second catalyst component that can be used in addition to the amine salt catalyst is a metal carboxylate. Examples include metal salts of aromatic carboxylic acids such as lead naphthenate and metal salts of aliphatic carboxylic acids such as potassium acetate. More specific examples include alkali metal salts of aliphatic carboxylic acids such as potassium acetate. More specific examples include alkali metal salts of aliphatic carboxylic acids such as potassium acetate. More specific examples include alkali metal salts of aliphatic monocarboxylic acids having up to 30 carbon atoms. Preferably, the metal salt is potassium 2-ethylhexoate, otherwise known as the octoate, which may be obtained as a mixture with a solvent carrier. Thus, the T-45 catalyst material sold by M&T Chemicals, Inc., of Rahway, N.J. is a 65% solution of potassium 2-ethyl-hexoate in polypropylene glycol having a 14% K content and a glycol hydroxyl number of 265 and may be used in the invention in an amount ranging from 0105 to 8% by weight of all starting ingredients. Further, DM-9556 sold by M&T Chemicals, which is T-45 diluted with polypropylene glycol to 10%K, may be used. Other metal carboxylates include those of tin and a mixture of tin and potassium. Examples of these materials include The CNF line sold by M&T Chemicals. Specifically, CNF-576 has potassium and tin contents of 10.3% and 1.5% by weight, respectively. CNF-667 has potassium and tin contents of 6.9 and 7.8% by weight, respectively. Both of these have diluent carriers having hydroxyl numbers of 265.

A third catalyst component which can be used in conjunction with the two described above is a dimethylaminomethyl-substituted phenol based compound. Thus, the DMP line of catalysts sold by the Rohm and Haas Company of Philadelphia, PA are examples. Specific examples include DMP-10 and DMP-30 which is the Rohm and Haas brand of 2,4,6-tris(dimethylaminomethyl)phenol.

Representative compounds which supply the metal ions to aid in the decomposition of the peroxide include salts and acetylacetonates of potassium, cobalt, copper, vanadium, manganese and lead, etc. These accelerators should be soluble in the polyester mixture with common commercial products being octoates and naphthenates. Typical blowing agents include (a) inert solvents having low boiling points such as trichloromonofluoromethane, dichlorofluoromethane, dibromotetrafluoroethane, trichlorotrifluoroethane, methylenechloride, pentane, trichloroethane, benzene, n-hexane and the like; (b) compounds which generate carbon dioxide by reacting with an isocyanate, such as water, hydrated water containing compounds nitroalkanes, aldoximes, acid amides, enolizable compounds and the like; (c) compounds which generate gas by thermal decomposition by the heat or reaction provided in the formation of the foam such as sodium bicarbonate, ammonium bicarbonate, azobisisobutyronitrile, azoaminobenzol, dinitrosopentamethylenetetramine and the like. The preferable blowing agents are the compounds included in the group (a) and the optimum blowing agent is trichloromonofluoromethane. For insulation foam, group (b) compounds are least desirable because their use results in a foam with open cells. Preferably the system is essentially water free or as near as possible to this condition.

The silicone surfactants found to be useful in the present invention to insure entrapment and uniform dispersion of gaseous products include the siliconeoxyalkylene block copolymers that fall into two classes, depending upon the nature of the linking group between the organosiloxane and the oxyalkylene portion of the molecule. Thus, the silicone surfactants are characterized as hydrolyzable where the moieties are joined by a silicon-oxygen-carbon bond is silicon-carbon. Concentrations in the amount of about 1% by weight have been found satisfactory, with a practical useful range being about 0.5–4% by weight. Silicone surfactants are available under a number of trade names known to those skilled in this art. Some of the silicone surfactants particularly useful for this invention are Union Carbide's L-520, L-532, L-5340, L-5350, L-5430, L-5710, L-5410, and L-5420, General Electric's SF-1066, and Dow Corning's 193, 195, 197, and 190.

Well known fillers, pigments, dyes, etc., may also be included in the foam, if so desired.

While the production of commercially sized foamboard, as well as other insulating foam products is clearly contemplated by the use of my invention. I do not claim, per se, well known and commercially available production machinery for such purposes, or systems employing said machinery; these systems are readily available for the commercial production of foamboard, or foam planks and the like.

As an example, insulating foamboard, produced commercially using my invention is normally produced in thickness of about ¼ inch to 4 inches, with a 1 inch thickness, perhaps being the most common. Panel sizes can vary, but the standard 4 by 8 feet size is most common.

Several commercially available systems are noted briefly. These included the Kornyak air bearing conveyor-laminator foamboard machine; the so-called slat board laminator system, wiedly used in the production of rigid foam, and involving the use of two-conveyor-belts, one placed atop the other; the free rise laminator system, and the precision nip roll laminator system which is a modification of the free rise system. Fruther information about these systems can be readily obtained from standard relevant engineering handbooks, and from the disclosures concerning these systems in U.S. Pat. No. 4,386,166, which is incorporated herein by reference.

Also, as noted hereinbefore, the rigid insulating foams can be formed in place or in situ, and by using closed molds such as pour-in-place building insulation.

The following Examples show specific embodiments of the invention; however, it is understood that other related embodiments and/or variations which would be obvious to one skilled in the art fall within the scope of the invention.

EXAMPLE 1

PREPARATION OF THE UNSATURATED POLYESTER

Several unsaturated polyester components or compositions were prepared by a fusion processing technique, disclosed in more detail hereinafter. Table II, below, gives the proportions and names of the ingredients. All parts and percentages are by weight, unless otherwise stated.

TABLE II

| Chemical Components | PART A Parts | Wt. % | Molar Ratio* |
|---|---|---|---|
| Propylene Glycol | 458 | 3.05 | 4.2 |
| Dipropylene Glycol | 384 | 25.6 | 2.0 |
| Isophthalic Acid | 238 | 15.9 | 1.0 |
| Maleic Anhydride | 420 | 28.0 | 3.0 |
| | 1500 | 100.0% | |

TABLE II-continued

| Chemical Components | PART A Parts | Wt. % | Molar Ratio* |
|---|---|---|---|

*For ease of reference, the isophthalic acid is reduced proportionally to a value of 1.0, an the other components are then mathematically related thereto.

(a) the propylene and dipropylene glycols, maleic anhydride and isophthalic acid were added to a 5-neck flask fitted with stirrer, thermometer, inert gas inlet, fractiionation column and heating mantle. The mixed glycols/acids reaction was conducted at elevated temperature, and under atmospheric pressure until the desired endpoint was reached. Three separate runs were made. The temperature was in the range of 215° C.–225° C. for about 20–30 hours. As the temperature was raised from ambient, evolution of water indicated the initiation of the polycondensation reaction, i.e., the formation of the unsaturated polyester. A nitrogen sparge was maintained throughout the course of the reaction, which was followed by the amount of water liberated and also by determination of the acid number of the reaction mixture. The hyroxyl numbers of the finished unsaturated polyesters were 173, 207, and 209, respectively. The acid numbers were 2.5, 2.3 and less than 3. The average viscosity of the unsaturated polyesters was about 3200 poise @25° C.

(b) In the case of the unsaturated polyester from just the dipropylene glycol and maleic anhydride, the hydroxyl number was 145, acid number 8.4 viscosity 202 poise @25° C. The procedure used was essentially the same as in (a) above, except that the reaction was carried out at a temperature of about 210° C. for about 15 hours at atmospheric pressure, and then for about 8–9 hours at a temperature of 160° C.–180° C. at 30 mm Hg. The formuation for part (b) is given below in Table II, Part B. Approximately 50 ppm of hydroquinone inhibitor was incorporated in this maleic anhydride polyester due to the fact that an unsaturated polyester based on 100% unsaturated dicarboxylic acid such as maleic anhydride has a tendency to self-polymerize.

TABLE II

| Chemical Component | PART B Parts | Wt. % | Molar Ratio |
|---|---|---|---|
| Dipropylene Glycol | 1642.5 | 65.7 | 1.4 |
| Maleic Anhydride | 857.5 | 34.3 | 1.0 |
| | 2500.0 | 100.0% | |

EXAMPLE 2

FORMULATION AND PREPARATION OF RIGID URETHANE FOAMS

Rigid polyurethane foams, both unmodified and modified according to the present invention, were prepared using the following formulations and procedure. The unmodified or standard formulation is labeled as such and with an "A", while those formulations employing the unsaturated polyester component of the present invention on the polyol or B side, and styrene on the A side or "Iso" side, according to the present invention are labeled as (B), (C), (D) and (E). All amount or parts are by weight, unless otherwise stated.

TABLE III

RIGID URETHANE FOAM FORMULATIONS

| Component of* Formulation | Unmodified or Standard | | | | |
|---|---|---|---|---|---|
| | A | B | C | D | E |
| Side "B" (Polyol) | | | | | |
| Poly G 75-440[1] | 100 | 100 | 100 | 100 | 100 |
| UPE (PG/DPG)[2] | — | 15.0 | 25.0 | 35.0 | — |
| UPE (DPG)[3] | — | — | — | — | 15.0 |
| DC-193 | 2.0 | 2.0 | 2.0 | 2.0 | 2.0 |
| Polycat 8 | 3.0 | 3.0 | 3.0 | 3.0 | 3.0 |
| Freon 11 | 33.0 | 33.0 | 33.0 | 33.0 | 33.0 |
| 6% CO. Naph | — | 0.06 | 0.10 | 0.14 | 0.06 |
| Side "A" (ISO) | | | | | |
| Mondur MR | 115.6 | 118.0 | 122.0 | 127.0 | 117.0 |
| Sytrene | — | 15.0 | 25.0 | 35.0 | 15.0 |
| MEK Peroxide | — | 0.30 | 0.50 | 0.70 | 0.30 |
| NCO/OH Ratio | 1.14/1.0 | 1.10/1.0 | 1.10/1.0 | 1.10/1.0 | 1.10/1.0 |
| Reactivity (Seconds) | | | | | |
| Cream Time | 30 | 32 | 38 | 45 | 40 |
| Gel Time | 70 | 80 | 100 | 110 | 93 |
| Tack-free | 100 | 130 | 160 | 180 | 150 |

[1]Hydroxyl No: 423
[2]Hydroxyl No: 17 and acid no of 2.5 (from Example 1)
[3]Hydroxyl No: 145 and acid no of 8.4 (from Example 1)
*Identification Components

EXAMPLE 3

(a) PHYSICAL PROPERTIES OF RIGID FOAMS PREPARED USING THE MATERIALS AND PROCEDURES OF EXAMPLES 1 AND 2

In the Table IV, below, the foam types are identified by capital letters, "A", "B", "C", etc., which correspond to the formulation A, B, C, etc. of Table III.

TABLE IV

RIGID URETHANE FOAM PHYSICAL PROPERTIES

| Foam Type | Density lbs/cu ft | Dimensional Stability * | ** | (4 wks) *** | Compressive strength "&" | K Factor |
|---|---|---|---|---|---|---|
| Std or Unmod "A" | 1.96 | 12.5 | 5.3 | 12.8 | 33.7/— | 0.146 |
| UPE "B" Modified | 1.96 | 8.7 | 2.8 | 8.4 | 29.0/15.7 | 0.151 |
| UPE "C" Modified | 1.97 | 4.9 | 0.4 | 1.9 | 25.3/15.0 | 0.161 |
| UPE "D" Modified | | | Internal Splitting | | | |
| UPE (E) Modified | 1.99 | 8.6 | 4.2 | 11.3 | 33.7/17.9 | 0.155 |

*Dimensional Stability under conditions of 158° F. & 95% Rel humidity.
**Dimensional Stability under conditions of 200° F. & ambient humidity.
***Dimensional Stability under conditions of 240° F. & ambient humidity.
"&" The figure before the slash is the compressive strength measured parallel to the foam rise; the figure after is perpendicular to foam rise.

(b) DISCUSSION OF PHYICAL DATA PROPERTIES

All test data were determined by standard ASTM tests. For example, the Thermal Transmission Properties of K-Factor was determined by ASTM Test Designation C177-76; the Dimensional Stability by ASTM Test Designation ANSI/ASTM Test Designation D 2126-75, and so on. In the dimensional stability test no facia of any kind was used, and any foam skin, if present, was removed in accordance with the test procedure.

It is noted that the K-Factor, or Thermal Transmission properties are all within acceptable and characteristic limits, for a polyurethane insulating foam, varying from 0.146 to 0.162. The average K-Factor of the samples tested was 0.154 and no K-Factor deviated by more than ±0.008 (8 thousandths) from said average. Thus, the important thermal transmission property of the rigid urethane foam product did not vary appreciably, and the modified products are entirely satisfactory for insulating purposes. (The K-Factor, sometimes referred to as the insulative k value, is the number of Btu passing through, or transmitted per hour, on a 1 inch thick sample of the foam or insulation, having an area of 1 sq. ft., with a temperature difference of 1° F. between front and back surfaces of the sample). Likewise the density, ASTM D 1622-70, in lbs/cu ft, the compressive strengths in lbs per sq inch, ASTM 1621-73, the percent closed cells, and the friability, of the modified products are all within entirely acceptable limits. Accordingly, the essential and important physical characteristics of the modified foam have not been altered in any appreciable way from those of a more or less standard and at least commercially representative polyurethane foam, while at the same time the dimensional stability of the modified products of my invention show very significant improvement, as discussed hereafter.

The truly significant and unexpected improved performance of the invention is shown by the dimensional stability data, which can best be appreciated by reading the columns in a downward or vertical fashion. Dimensional stability, as determined by the ASTM test abovenoted, basically demonstrates the response of rigid cellular plastics to thermal and/or humid exposure or aging conditions, and is thus an accurate predictor of the foamed insulating products to "in use" or actual long-term thermal and/or humidity conditions. Usually, dimensional stability is determined only at 158° F. and about 95% humidity for no more than two weeks. However, in order to demonstrate even more dramatically the unexpected improvement and utility of the present invention, I also tested my foamed products under more stringent and vigorous conditions, namely the samples were tested @200° F., a temperature near the boiling point of water, for four weeks and at ambient humidity; and also @240° F., a temperature above the boiling point of water, to see what would happen. These tests are not unrealistic; in fact the 200° F. test is thought to best illustrate the utility of the invention. In many areas of the world, such as the southwest part of our country, and in places South America or the Middle East, essentially anywhere desert-like or near desert-like conditions prevail geographically, the need for effective insulation such as roofing panels on homes or industrial structures, or the like, is critical and long-term heat effects, especially in summer, can priamid temperatures on the roof to approximately 200° F., possible even higher, particularly during the hottest part of the day. Moreover, especially in summer, even after the sun goes down, heat does not quickly dissipate from structures, including the roof, and surely not quickly enough before the next day's morning sun comes up.

Referring to the test data in Table IV, the change in the dimensions of the three principal axes of the samples was determined to the nearest ±0.1% by measuring the sample (a) before exposure and thermal aging etc., that is at room temperature, approximately 72° F., and then (b) after long-term aging or exposure. Thus, percent volumetric expansion is inherent in the data.

Comparing the standard or unmodified sample, with my products first at 158%F. and 95% Relative Humidity for 4 weeks, it is to be noted that the percent change in dimensional stability (or percent change in expansion, it is to be noted that the percent dimensional changes were, for (reading downward or in vertical fashion).

Standard Unmodified Sample A: 12.5%
Sample B Modified: 8.7%
Sample C Modified: 4.9%
Sample E Modified: 8.6%

The lower the % dimensional change or expansion, the better the improvement in dimensional stability; thus the percent improvement varied from 31.2% (12.5%–8.6%, divided by 12.5%) to a dramatic 60.8% (12.5%–4.9%, divided by 12.5%) compared with the standard unmodified composition. Even more dramatic is the data for dimensional stability at the 200° F. conditions, 4 weeks, ambient humidity. Interpreting and calculating the results in a similar manner, we find that the standard changed 5.3%. My samples, on the other hand, varied from an amazing 0.4%, i.e. Sample C, to 4.2%, Sample E. The percent improvement thus varied from a high of 92.4% improvement in dimensional stability (Sample C) to 20.7% (Sample E). The 200° F. conditions represent a situation somewhat like using the insulation on a structure under the worst of desert conditions or environments. Most important of all, this improvement has been achieved without any appreciable loss or change in other important physical properties, as can be seen from Table IV, and its data.

In comparing Sample D, modified, it is noted that the speciman failed by internal splitting. From Table III and IV, and from other data, it has been determined that the cross-linked unsaturated polyester resin, that is, the wt % of the combination of unsaturated polyester component and the cross-linking monomer such as styrene, should vary from about 2% to about 22% by weight of the total polymeric content, the balance, of course, being the polyurethane, which can vary from about 98 wt % to about 78 wt % of the total polymeric foam (polymeric content only). In the case of Sample D, the content of the unsaturated polyester and the cross-linker, styrene were at their highest level, namely 35 parts by weight of unsaturated polyester component, 35 parts by weight of styrene, 100 parts of the polyether polyol and 127 parts of the polymethylene polyphenyl isocyanate, all parts being by weight. (Catalysts, surfactants, blowing agents and the like were, for calculation purposes not considered part of the solid polymeric weight).

Thus, subject to the proviso mentioned below, 70 parts of styrene cross-linked unsaturated polyester resin were formed with 227 parts of the urethane polymer (adding the 100 and 127 part noted above). Dividing 70 parts (and, incidentally, throughout the specification and claims, all parts and percentages are by weight, unless otherwise stated) by the total of 227 plus 70, or 297, gives a figure of B 23.56% by weight cross-linked polyester resin component, which is outside the scope of Applicant's invention. In the calculation noted above, there is an inherent, minor but insignificant factor which has to be handled in some manner, and that is the fact the hydroxyl-terminated polyester component links up with the isocyanate group to become part of the polyurethane network. However, the overwhelming part of the unsaturated component is, on a weight basis, made up of a polymer chain that does not include the terminating hydroxyl group. Thus, for calculation purposes, the polyester component, including its small weight % of hydroxyl content is treated as part of the sytrene cross-linked polyester resin. (Of course, it could be figured the other way, i.e. as part of the urethane, but the results would not differ more than about 0.1 to 0.2%.

To summarize, the styrene, or like monomer, cross-linked unsaturated polyester resin should comprise about 2 to about 20%, more preferably, about 5% to 18%, by weight, of the total polyester modified polurethane polmeric network, on a solids basis with the balance being 98 to about 80%, and more preferably 96 to about 82%, by weight polyurethane, on a weight basis.

(This is one of the major differences between my invention and that of Peterson et al., which is thought to be the closest prior art. That is, Peterson et al, even from a cursory glance of the title and claims deals with a modified polyester foam, modified so to speak by the polyurethane, in which the polyester resin predominates or is present in major amount or close to it, whereas in my invention, the cross-linked unsaturated polyester resin is, on a weight basis a minor part of the entire polymeric network, including the polyurethane. While the utility of both the prior art, and that of my invention, i.e., preparation of a rigid insulating foam, the approaches taken are entirely different).

EXAMPLE 4

FORMULATION AND PREPARATION OF URETHANE ISOCYANURATE RIGID FOAMS-UTILIZING TRIMERIZED ISOCYANATE

In a manner similar to Examples 2, above and one above, rigid urethane-Isocyanate foams are prepared from the following formulation, except where changes are noted. The polyether polyol used was Multranol 9234, having a hydrozyl No. of 348 and a hydroxy equivalent weight of 161 the unsaturated polyester component was prepared in the same manner as in Example 3, above, from the mixed glycols PG/DPG, in the same proportion, and the mixed acids in the same proportion; this gave an unsaturated polyester component having a hydroxyl No. of 209 and an acid No. of less than 3.

EXAMPLE 5

PHYSICAL PROPERTIES OF RIGID FOAMS FROM (a) EXAMPLE 4

TABLE IV

| | RIGID URETHANE FOAM PHYSICAL PROPERTIES | | | | | | | |
|---|---|---|---|---|---|---|---|---|
| Foam Type | Density lbs/cu ft | Dimensional Stability (4 weeks) | | | Compressive strength "&" | K Factor | % Closed Cells | Friability % wt loss |
| | | * | ** | *** | | | | |
| Std or Unmodified "F" | 1.67 | 11.5 | 6.3 | 15.8 | 24.91 | 0.142 | 93 | 17.0 |
| UPE Modified | 1.53 | 12.7 | 5.7 | 14.9 | 18.5/ 10.7 | 0.144 | 92 | 13.2 |
| UPE Modified | 1.58 | 9.7 | 8.0 | 12.9 | 17.8/ 10.7 | 0.151 | 91 | 19.4 |
| UPE Modified | 1.68 | 9.5 | 5.0 | 11.6 | 21.8/ 12.6 | 0.156 | 91 | 13.6 |

*Dimensional Stability under conditions of 158% F. & 95% Rel humidity.
**Dimensional Stability under conditions of 200° F. & ambient humidity.
***Dimensional Stability under conditions of 240° F. & ambient humidity.
"&" The figure before the slash is the compressive strength measured parallel to the foam rise; the figure after is perpendicular to foam rise.

Conventional trimerization catalysts such as DMP-30 and K Hex Cem 997 were used. The formulations are given in Table V below. The formulations labeled "F", "G", "H" and "I" in this Example, show performance data given in Example 5, infra, and the same letters "F", "G", "H" and "I" correspond. So before, all amounts are by weight, unless otherwise stated.

TABLE V

| | RIGID URETHANE - ISOCYANURATE FOAM FORMULATIONS | | | |
|---|---|---|---|---|
| Component of Formulation* | Unmodified or Standard "F" | "G" | "H" | "I" |
| | Side "B" (Polyol) | | | |
| Multranol 9234 | 100.00 | 100.00 | 100.00 | 100.00 |
| UPE (PG/DPG)(1) | — | 5.0 | 15.0 | 25.0 |
| DC 193 | 1.1 | 1.1 | 1.1 | 1.1 |
| K Hex Cem 977 | 2.5 | 2.5 | 2.5 | 2.5 |
| DMP 30 | 0.8 | 0.8 | 0.8 | 0.8 |
| Freon 11 | 39.0 | 39.0 | 39.0 | 39.0 |
| 6% Co. Napth | — | 0.02 | 0.06 | 0.08 |
| | Side "A" (ISO) | | | |
| Mondur MR | 124.0 | 126.0 | 130.2 | 137.2 |
| Styrene | — | 5.0 | 15.2 | 15.1 |
| MEK Peroxide | — | 0.10 | 0.30 | 0.41 |
| NCO/OH Ratio | 1.49/1.00 | 1.47/1.00 | 1.441/1.00 | 1.43/1.00 |
| Reactivity (Seconds) | | | | |
| Cream | 19 | 19 | 20 | 24 |
| Gel | 42 | 51 | 59 | 65 |
| Tack-Free | 63 | 75 | 90 | 112 |

(1)Unsaturated polyester component hydroxyl No. of 209; acid No. less than 3, proportions of Glycols and Acid, as in Part A of Example 1, Table II.
*Indentification of Components
Multranol 9234. (Mobay) poletherer polyol
UPE (PG/DPG) - Nomenclature same as in Table III
DC-193 - See Table III
K folx Cem 977 - Potassium Metal Carboxylate, 15%, potassium
DMP-30 - See Table III
Freon II - See Table III
6% Co. Napth - See Table III
Mondur MR - The Mondur MR used in Table V had an assay of 31.3% NCO and functionality of 2.7
MEK Peroxide - See Table III (b) Using a similar analysis as in Part (b) of Example 3, above, the percent improvement in dimensional stability can be calculated.

EXAMPLE 6

DETERMINATION OF UNREACTED STYRENE IN RIGID FOAM

Several of the polyester modified polyurethane foams were tested for a residual, monomeric styrene by refluxing the sample in hexane for 16 hours using a Soxhlet Extractor. The results are shown in Table VII below. In each case, the residual monomeric styrene content was appreciably lower than 1000 ppm.

TABLE 7

| Foam Type | Residual Styrene, PPM |
|---|---|
| Formulation B of Table III | 504–796 |
| Formulation C of Table III | 487–721 |
| Formulation E of Table III | 483–861 |

Although specific embodiments of the invention have been set forth, it will be obvious to those skilled in the art that considerable modification can be made within the spirit and scope of the invention.

What is claimed:
1. In the method of producing a polyester modified polyurethane foam wherein a polyol composition is reacted by mixing said composition with a polyisocyanate composition, said compositions, both being in a liquid form when mixed, and when taken together, containing the usual polymerization reaction catalysts, blowing agent and surfactant to form a foamed or cellular structure having a high percentage of closed cells, the polyol composition containing an unsaturated polyester resin with hydroxyl functionality and a polyether polyol with hydroxyl functionality, the improvement which comprises including with the polyisocyanate composition a vinylidene monomer to crosslink the unsaturated polyester resin while the polyisocyanate composition undergoes urethane polymerization by reaction both with the hydroxyl functionality of the unsaturated polyester resin and with the hydroxyl functionality of the polyether polyol to form a crosslinked modified foam having improved physical properties.

2. Method according to claim 1 wherein the foam is a rigid insulating foam.

3. Method according to claim 1 wherein substantially all of the vinylidene monomer is present in the polyisocyanate composition and essentially no curing inhibitor is present in the polyol composition.

4. Method according to claim 3 wherein the foam is rigid insulating foam.

5. Method according to claim 1 wherein the vinylidene monomer is selected from the group consisting of vinyl aromatics such as vinyl toluene, styrene, alpha-methylstyrene, divinyl benzene, dichlorostyrene, allyl esters of alpha, beta ethylenically unsaturated monocarboxylic acids such as methyl methacrylate, ethylacrylate and 2-ethylhexylacrylate and vinyl esters such as vinyl acetate and vinyl propionate.

6. Method according to claim 5 wherein the foam is a rigid insulating foam.

7. Method according to claim 3 wherein the vinylidene monomer is styrene.

8. Method according to claim 7 wherein the foam is a rigid insulating foam.

9. Method according to claim 8 wherein the weight percentages in the combination of (a) the vinylidene monomer and (b) the unsaturated polyester component, comprises 30–70% of (a) and, correspondingly, 70–30% of (b).

10. Method according to claim 9 wherein the vinylidene monomer and unsaturated polyester resin comprise from about 2% to about 22% by weight of the total weight of the polyester modified polyurethane foam, the balance being 98% to about 78% by weight polyurethane.

11. Method according to claim 10 wherein the unsaturated polyester resin is based on a glycol from the group of propylene glycol or dipropylene glycol or mixtures thereof, and a dicarboxylic acid from the group of maleic anhydride or isophthalic acid or mixtures thereof.

12. A product produced according to the method of claim 1.

13. A product produced according to the method of claim 11.

14. A process of producing a modified polyurethane insulating foam composition having a density in the range of about 1 to about 40 lbs per cubic ft. which comprises:

preparing a polyol composition B, comprising an unsaturated polyester resin miscible with or dispersible within a polyether polyol of medium to high molecular weight, a urethane polymerization catalyst, a metal accelerator for initiating peroxide decomposition, a fluorocarbon blowing agent, and a silicone surface active agent;

preparing a polyisocyanate composition A, comprising a polymethylene polyphenyl isocyanate containing vinylidene monomer and an organic peroxide catalyst for initiating the reaction between the vinylidene monomer and the unsaturated polyester resin;

mixing said composition A and B together to initiate reaction and generate a heat of polymerization, said reaction producing a cellular product, said heat of polymerization being sufficient to cause reaction of the vinylidene monomer with the unsaturated polyester resin and essentially simultaneous reaction of the polymethylene polyphenyl isocyanate with the hydroxyl functionality of the unsaturated polyester resin and with the functionality of the polyether polyol, said polymerization reaction being initiated at substantially the same time and being carried to completion substantially uniformly during the time frame, said crosslinked polyester resin being uniformly present throughout the urethane polymeric network in such fashion to function as discrete reinforcing elements providing sufficient strength to reduce volumetric expansion during extended periods of exposure of the foamed product to long term heat or combined heat and humidity effects.

15. A product produced by the process of claim 14.

* * * * *